UNITED STATES PATENT OFFICE.

HEINRICH ENGBERT, OF HÖRDE, GERMANY.

MANUFACTURE OF ARTIFICIAL SANDSTONE.

SPECIFICATION forming part of Letters Patent No. 701,690, dated June 3, 1902.

Application filed January 7, 1902. Serial No. 88,806. (No specimens.)

*To all whom it may concern:*

Be it known that I, HEINRICH ENGBERT, a subject of the Emperor of Germany, and a resident of Hörde, Germany, have invented a certain new and useful Process for the Manufacture of Artificial Sandstone, of which the following is a specification.

This invention relates to the manufacture of artificial sandstone. The manufacture of this substance is known to be based upon the fact that a material containing silicic acid (sand, &c.) is mixed with lime, which latter is then slaked and serves as the binding means for the material after the mixture has been molded. As blast-furnace slag contains a high percentage of silicic acid, the above-named process has been extended so as to utilize such slag in lieu of sand. In carrying out this process the blast-furnace slag is mixed with unslaked lime in the same manner as if sand has been used, the lime being then slaked under certain conditions—for example, in accordance with the German patent, No. 109,555—so as to produce the required effect. Most blast-furnace slag contains, however, silicate of calcium—*i. e.*, a compound containing lime and silicic acid—and this fact is utilized in the improved process according to this invention, so that the addition of lime is rendered unnecessary and a considerable reduction in the cost of the production is effected.

According to the improved process the slag is placed in a drum in a finely-ground or reduced condition until the drum is about half filled, whereupon said drum is rotated and high-pressure steam introduced into the interior through the hollow drum-shaft for a certain time. Steam is then shut off, and to the material after this preliminary treatment is then added another material containing silicic acid, such as sand or blast-furnace slag. Thereupon the drum is again rotated, so as to insure the intimate mixing of the materials. This mixture is then removed into the mold and subjected to very high pressure. The stone is thus properly pressed in a steam-tight room, into which high-pressure steam is introduced and maintained for about eight to ten hours. This completes the manufacture of the stone.

Experiments conducted on the lines of this improved process have resulted in the production of an exceedingly hard building-stone, to which any desired color may be imparted by the admixture of suitable coloring-matter.

The reactions in connection with this process are believed to be as follows: The first preliminary treatment of the reduced slag with steam under high pressure and corresponding application of heat produces greater binding power of the lime contained in the silicates than with any ordinary process. After the termination of this preliminary treatment the binding power thus produced is brought into action on the freshly-added material containing the silicic acid. The action may be further intensified by the application of high pressure in the mold. If the stone upon coming from the mold is left standing for sufficient time, it will harden by itself. This process may, however, be accelerated by placing the stone in steam-chambers, as before described. By reason of the prevailing temperature and pressure the steam so acts upon the stone as to complete the hardening process in eight to ten hours.

Having thus fully described my invention, what I claim, and desire to secure by Letters Patent of the United States, is—

1. The herein-described process for the manufacture of artificial sandstone comprising the agitation of pulverized slag under the action of high-pressure steam, adding thereto a material containing silicic acid, agitating again under the action of high-pressure steam, submitting the mixture in suitable molds to very high pressure, and finally drying the blocks thus formed.

2. The herein-described process for the manufacture of artificial sandstone comprising the agitation of pulverized slag under the action of high-pressure steam, adding thereto a material containing silicic acid, agitating again under the action of high-pressure steam, submitting the mixture in suitable molds to very high pressure, and finally drying the blocks thus formed by submitting for several hours to the action of high-pressure steam.

In testimony whereof I affix my signature.

HEINRICH ENGBERT.

In presence of—
WM. ESSENWEIN,
PETER LIEBER.